US012623857B2

(12) United States Patent
Laskis et al.

(10) Patent No.: US 12,623,857 B2
(45) Date of Patent: May 12, 2026

(54) VISION SENSOR INFEED SYSTEM

(71) Applicant: ILLINOIS TOOL WORKS INC.,
Glenview, IL (US)

(72) Inventors: JonPaul Laskis, Simpsonville, SC
(US); J. Mark Nunn, Simpsonville, SC
(US); Wayne J. Ryan, Simpsonville,
SC (US)

(73) Assignee: ILLINOIS TOOL WORKS INC.,
Glenview, IL (US)

( * ) Notice: Subject to any disclaimer, the term of this
patent is extended or adjusted under 35
U.S.C. 154(b) by 129 days.

(21) Appl. No.: 18/779,791

(22) Filed: Jul. 22, 2024

(65) Prior Publication Data

US 2024/0375883 A1      Nov. 14, 2024

Related U.S. Application Data

(63) Continuation of application No. 17/882,121, filed on
Aug. 5, 2022, now Pat. No. 12,054,344.
(Continued)

(51) Int. Cl.
*B65G 43/08*       (2006.01)
*B65G 47/28*       (2006.01)

(52) U.S. Cl.
CPC ............. *B65G 43/08* (2013.01); *B65G 47/28*
(2013.01); *B65G 2201/0244* (2013.01);
(Continued)

(58) Field of Classification Search
CPC ................... B65G 43/08; B65G 47/28; B65G
2201/0244; B65G 2203/0233; B65G
2203/0291; B65G 2203/041
(Continued)

(56) References Cited

U.S. PATENT DOCUMENTS

| | | | |
|---|---|---|---|
| 7,735,296 B2 | 6/2010 | Momich | |
| 11,117,754 B2 | 9/2021 | Berger et al. | |
| | (Continued) | | |

FOREIGN PATENT DOCUMENTS

| | | |
|---|---|---|
| DE | 102013207139 A1 | 10/2014 |
| DE | 102017209984 A1 | 12/2018 |
| | (Continued) | |

OTHER PUBLICATIONS

AU20093058437 (Year: 2010).*
(Continued)

*Primary Examiner* — Gene O Crawford
*Assistant Examiner* — Lester Rushin, III
(74) *Attorney, Agent, or Firm* — Pauley Erickson &
Swanson

(57)                ABSTRACT

A system and method for optimizing flow of a plurality of
products along a conveyor includes a conveyor drive con-
nected with the respect to the conveyor, the conveyor drive
configured to modulate the speed of the conveyor. A camera
positioned relative to the products on the conveyor. A
processing unit is connected with respect to the camera and
the conveyor drive, the processing unit defining a zone along
the conveyor having a virtual longitudinal and lateral bound-
ary within a section of the conveyor, the processing unit
further determining relative product position metrics of the
products within the zone and communicating with the con-
veyor drive to modulate the speed of the conveyor thereby
optimizing a relative position of the products within the
zone. In addition, the subject system may be used for
inspection of conveyed products.

20 Claims, 5 Drawing Sheets

Related U.S. Application Data

(60) Provisional application No. 63/230,306, filed on Aug. 6, 2021.

(52) U.S. Cl.
CPC ............... *B65G 2203/0233* (2013.01); *B65G 2203/0241* (2013.01); *B65G 2203/0291* (2013.01); *B65G 2203/041* (2013.01)

(58) Field of Classification Search
USPC .................................................... 198/341.09
See application file for complete search history.

(56) References Cited

U.S. PATENT DOCUMENTS

| | | | |
|---|---|---|---|
| 11,878,871 | B2 | 1/2024 | Kiessner et al. |
| 2014/0224617 | A1 | 8/2014 | Kalkhoff |
| 2021/0047132 | A1 | 2/2021 | Sines et al. |
| 2022/0177241 | A1 | 6/2022 | Brinkmeyer et al. |
| 2023/0045211 | A1 | 2/2023 | Laskis et al. |
| 2023/0339695 | A1 | 10/2023 | Hensel et al. |

FOREIGN PATENT DOCUMENTS

| | | | |
|---|---|---|---|
| EP | 0190090 | A1 | 8/1986 |
| EP | 2455914 | A1 | 5/2012 |
| EP | 2947032 | A1 | 11/2015 |
| FR | 3018790 | A1 | 9/2015 |
| JP | 2011088741 | A | 5/2011 |
| WO | WO2007000441 | A1 | 1/2007 |
| WO | WO2020069803 | A1 | 4/2020 |
| WO | WO2021105381 | A1 | 6/2021 |

OTHER PUBLICATIONS

CA2920806 (Year: 2014).*

ISA/US, English language verison of the International Search Report, Form PCT/ISA/210, for International Application PCT/US2022/039698, Aug. 8, 2022 (06 pages).

ISA/US, Form PCT/ISA/237, Written Opinion of the International Searching Authority, for International Application PCT/US2022/039698, Aug. 8, 2022 (12 pages).

* cited by examiner

VISION SENSOR INFEED SYSTEM

CROSS REFERENCE TO RELATED APPLICATION

This application is a continuation of U.S. patent application Ser. No. 17/882,121, filed 5 Aug. 2022, which claims the benefit of U.S. provisional application Ser. No. 63/230, 306, filed on 6 Aug. 2021. The parent and related patent applications are hereby incorporated by reference herein in its entirety and are made a part hereof, including but not limited to those portions which specifically appear herein-after.

BACKGROUND OF THE INVENTION

This invention relates generally to a device for use in production and packaging that can accurately monitor and adjust product flow, population, and irregularities that occur on a manufacturing line, such as a conveyor line.

Traditional manufacturing lines include operator controls as part of a line control system. The speed of the manufacturing lines are maintained and/or programmed to follow the respective upstream or downstream speed of the machine. Such manufacturing lines may include accumulators for smoothing out bottlenecks in product pace, case packing, shrink wrapping, product inspection/rejection, tooling, IE robots, and/or other manufacturing steps.

Common methods of detecting product flow, population and related irregularities include mechanical type switches or sensors that are limited in their detection ability or require a disturbance of the package formation. One preferred current method of measuring the existence of products on the conveyor utilizes Boolean sensors that typically make physical contact with the product. These sensors may compromise the guide rail design of the conveyors and result in suboptimal product flow. They only detect the presence or absence of product and are unable to determine if product is moving or stationary. Physical contact with the product may cause damage to both the product and the sensor and, in a worst case, may even inhibit efficient product flow. More generally, sensors requiring physical contact change the flow pattern of the products and the population density and configuration of such in ways that may be detrimental.

A need exists for a system and method that can detect and react to flow, population, and irregularities—all without adversely disturbing the product formation.

SUMMARY OF THE INVENTION

The invention generally relates to a system and method that detects undesirable product flow and adjusts to normalize such flow.

The general object of the invention can be attained, at least in part, through the subject system and method which uses optimized computer vision algorithms. These algorithms will improve the control of function of a machine to facilitate better product flow through the packaging machinery.

In a preferred embodiment, a camera is placed relative to the flow of products, preferably over the flow. The use of an overhead camera system enables replacement of multiple contact sensors with a single touchless camera system. The camera system can detect product density in higher fidelity than a simple boolean flag thereby enabling precise control of conveyor speed via automated PID loop (feedback) adjustments rather than simple High/Low speed switching.

The same camera system can likewise measure product movement and minimize down time related to jam conditions. Current methods of "down bottle" or "broken bottle" detection require product filed into lanes after entering, for example, a case packer and is used to stop the machine for operator intervention. The smart camera system according to this invention can detect this issue earlier in the line while the product is still in mass flow. Earlier detection enables less costly intervention without downtime.

In one preferred embodiment, the input to the device will be a bulk stream of products. The output of the device will be a singular row or plurality of rows of single file products ready for presentation to the next machine or stage in the system.

Sensor capabilities include but are not limited to: product count; product spacing; product speed; product direction; product orientation (e.g., downed bottles); control of downstream equipment; lane balancing; and jam detection.

Other objects and advantages will be apparent to those skilled in the art from the following detailed description taken in conjunction with the appended claims and drawings.

DETAILED DESCRIPTION OF THE INVENTION

The present invention provides a system and method for optimizing flow of a plurality of products along a conveyor.

Figures 1, 2:
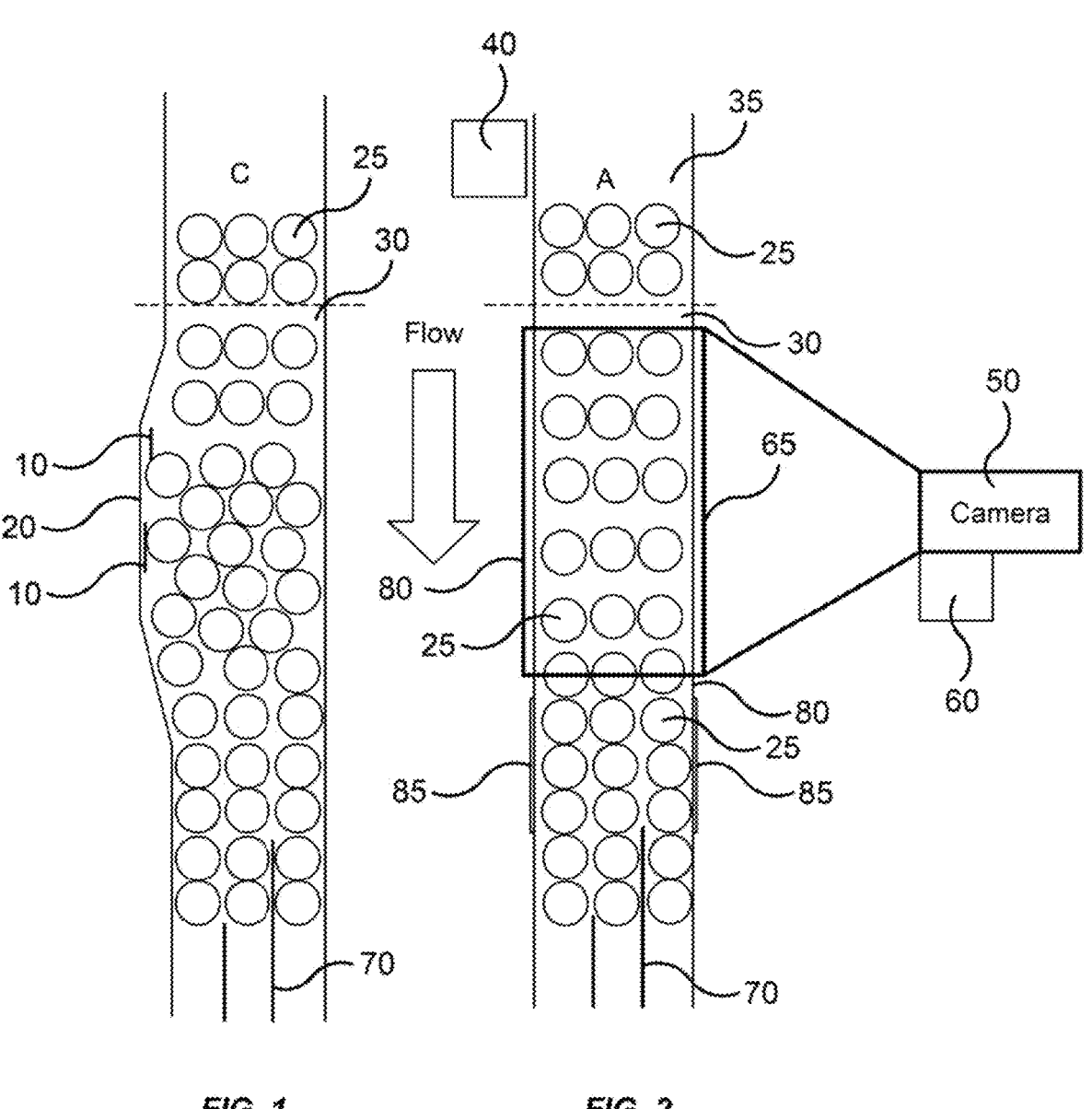
FIG. 1 is a schematic view of a prior art system.
FIG. 2 is a schematic view of vision sensor infeed system according to a preferred embodiment of this invention.

FIG. 1 shows a schematic of a prior art system that includes sensors 10 positioned within a widened section, or "bump out" 20, of a conveyor 30. Bulk product 25, such as a plurality of bottles, is fed through an infeed C to the conveyor 30 and sensors 10 make physical contact with the product 25 to detect the presence or absence of product. Based on the presence or absence of the product 25 detected, the system may be adjusted by speeding up or slowing down the conveyor and/or increasing or decreasing volume of product 25 to an infeed 35. As shown, the sensors 10 and bump out 20 create a disturbance in product flow by their mere presence and create inefficiencies in the product flow and grouping.

FIG. 2 shows a schematic of a preferred system and method for optimizing flow of a plurality of products along a conveyor 30. A conveyor drive 40 is connected with respect to the conveyor 30. The conveyor drive 40 is configured to modulate the speed of the conveyor 30, as described in more detail below.

A plurality of products 25 preferably travel along the conveyor 30 in either a mass flow or a single file flow pattern. Nonetheless, the system may include a division point 70 positioned along the conveyor 40 that includes one or more lane dividers to divide groups of products into two or more single lanes. By dividing up products 25 into individual lanes from a mass flow, the flow of the products may be better maintained within the subject system.

A camera 50 is positioned relative to the products 25 on the conveyor 30. In a preferred embodiment, the camera 50 is positioned directed overhead a flow of the products 25. Alternatively, the camera 50 may be positioned off center of overhead or to the side of product flow provided the camera 50 can still group and recognize distinct products 25 within the product flow.

A processing unit 60 is preferably connected with respect to the camera 50, either onboard the camera, separate from the camera or within the processing equipment of the production line. Likewise, the processing unit 60 is configured to communicate with the conveyor drive 40. The processing unit 60 preferably defines a zone 65 along the conveyor 30. The zone 65 preferably includes a virtual longitudinal and lateral boundary within a section of the conveyor 30. Within this zone 65, the camera 50 may detect a grouping of products and the processing unit 60 subsequently determines whether this grouping is optimized or sub-optimum. The processing unit 60 accordingly determines relative product position metrics of the products 25 within the zone 65 and communicates with the conveyor drive 40 to modulate the speed of the conveyor 30 thereby optimizing a relative position of the products 25 within the zone 65.

In one manner of operation, the processing unit 60 calculates a real-time product density within the zone 65 to modulate the speed of the conveyor 30. This real-time product density may be compared with an optimum density or configuration of products 25 to thereby adjust inputs to the conveyor 30.

Figure 3:
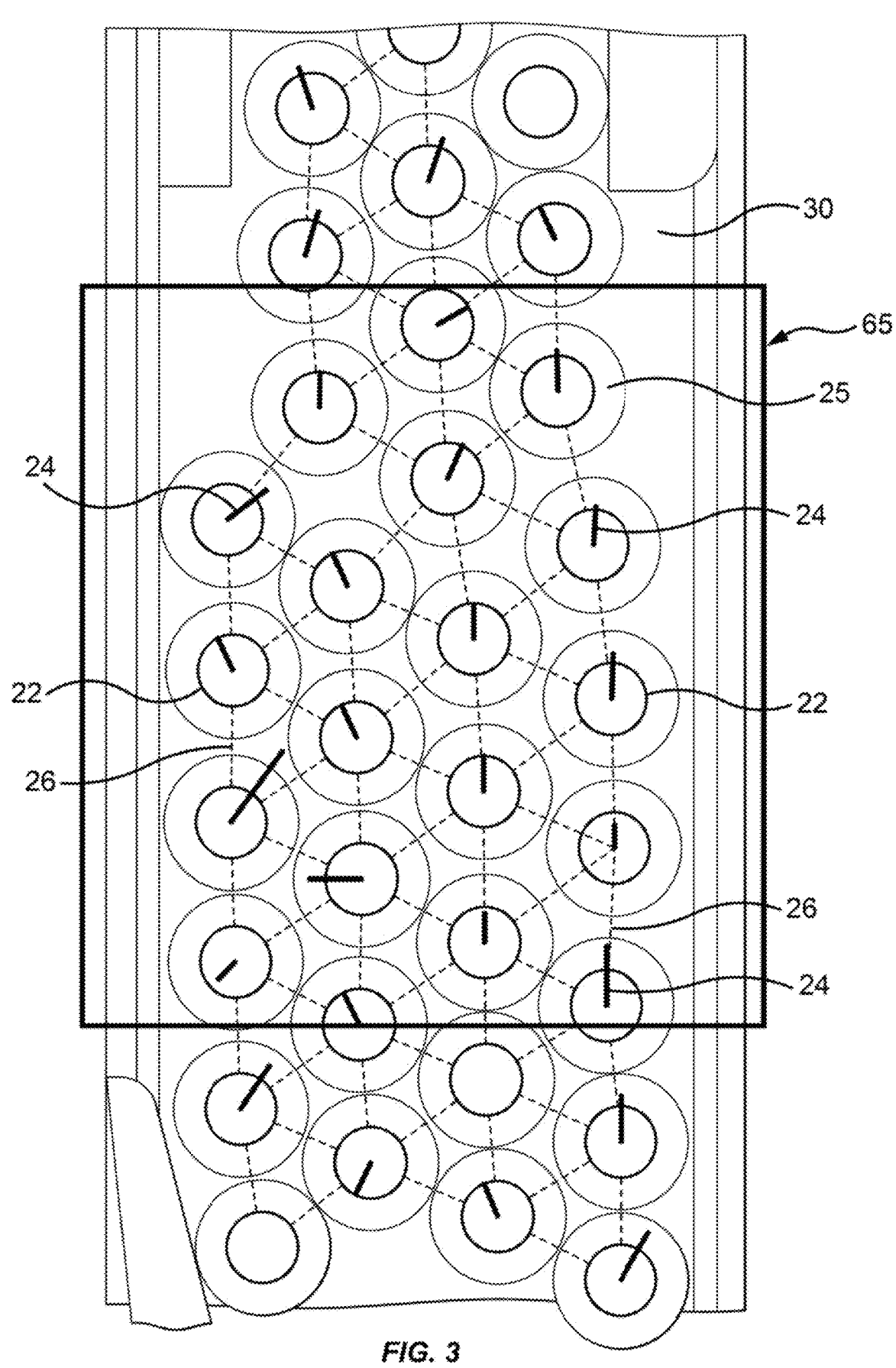
FIG. 3 is a process view of a vision sensor infeed system according to a preferred embodiment of this invention.

FIG. 3 shows one preferred embodiment of a process view seen through the camera 50 with realtime calculations by the processing unit 60. FIG. 3 shows a mass flow of products 25, in this case bottles, along a conveyor 30 and a zone 65 designated by a rectangular subset of all products 25 on the conveyor 30. The processing unit 60 identifies a reference feature 22 of the product, in this case a bottle cap. A vector and velocity 24 of the reference feature 22 are then calculated as represented by the lines extending from the bottle caps in FIG. 3. The longer the line, the faster the velocity of the product 24 and the direction of the line indicates the vector or direction of travel of the product 24. In addition, a distance 26 is calculated between each product 25 based on a center-to-center calculations or using predetermined product sizes. The vector and velocity 24 and the distance 26 of each product 25 is then used to determine the relative product position metrics of the flow of products.

The processing unit 60 modulates the conveyor 30 using feedback loop adjustments preferably to slow the conveyor 30 when the products 25 are spread out or speed the conveyor 30 when the products 25 are densely packed. The relative product position metrics comprise a distance between each adjacent product and a vector and velocity of the respective product. The distance between each product is preferably adjusted for a size of each product, as determined from a reference feature 22, to determine the relative product position metrics needed to provide feedback to the conveyor 30.

As shown in FIG. 2, the bulk product 25, in this case round products such as jars or bottles, is conveyed into the infeed to the device in section "A". The sidewalls 80 or guides are set to cause the product to form a nested configuration. In this nested product configuration, products 25 are angularly aligned in 60 degree angular alignment between two or more round products traveling in the same direction on the conveyor 30. In this embodiment, the round products 25 must be in contact with each other with some external guide, such as sidewalls 80, to maintain the nested pattern.

The conveyor drive 40 controlling the upstream bottle population will be modulated by a contactless vision sensor, the camera 50, located in the detection zone 65. Detected product population and flow information in that zone will be feedback to a PLC to modulate the speed of conveyor drive 40 and thus conveyor 30. Based on this information, the associated conveyor drive 40 speed will be adjusted to reduce or increase the product 25 population. The processing unit 60 through the camera 50 will ensure gapping between product row patterns are uniform and loose enough to maintain system fluidity. Line pressure due to products 25 backing up will not allow the product 25 to make up gaps in the nested flow of product 25. Jamming at division points 70 will be reduced further ensuring the efficacy of the system.

FIG. 1 depicts a typical sensing device arrangement. When product backs up to sensors 10, conveyor 30 will be modulated to supply the correct number of products 25 to the system. This method relies on the disturbance of the product population and increases back pressure of the product into the division points 70.

Because the subject system is capable of running without additional in-line sensors 10 or bump-outs 20 along the conveyor 30, the conveyor 30 may include generally linear sidewalls 80. Such linear sidewalls 80 may help to smooth out the flow of product 25 along the conveyor 30.

In addition to feedback to the conveyor drive 40 to control speed of the conveyor 30, the processing unit 60 may provide feedback to one or more dynamic sidewalls 85 along the conveyor 30. The dynamic sidewalls 85 may be adapted to change configuration or zone latitude based on feedback from the processing unit 60. Real time changes in the dynamic sidewalls 85 can then adapt to changes in the line including jams, temperature, product material variations and/or product shape variations.

A related method for optimizing flow of a plurality of products 25 along a conveyor 30 includes driving a conveyor 30 with a conveyor drive 40 adapted to modulate the speed of the conveyor 30. A camera 50 is positioned relative to the products 25 on the conveyor 30. A zone 65 is defined along the conveyor 30 with a processing unit 60 connected with respect to the camera 30 and the conveyor drive 40, wherein the zone 65 includes a virtual longitudinal and lateral boundary within a section of the conveyor 30. Relative product position metrics of the products 25 are determined within the zone with the processing unit 60 and communicated to the conveyor drive 40 to modulate the speed of the conveyor 30 thereby optimizing a relative position of the products 25 within the zone 65.

The subject system may be used in connection with product counts and lane balancing and confirming correct position/orientation of such products. In addition, the subject system may be used with product case inspection in a similar manner. Further, the subject system can be used for case counts, empty/full case confirmation, bullseye inspection on shrink wrapped product and other inspection related requirements for packaging and handling operations.

Figure 4:
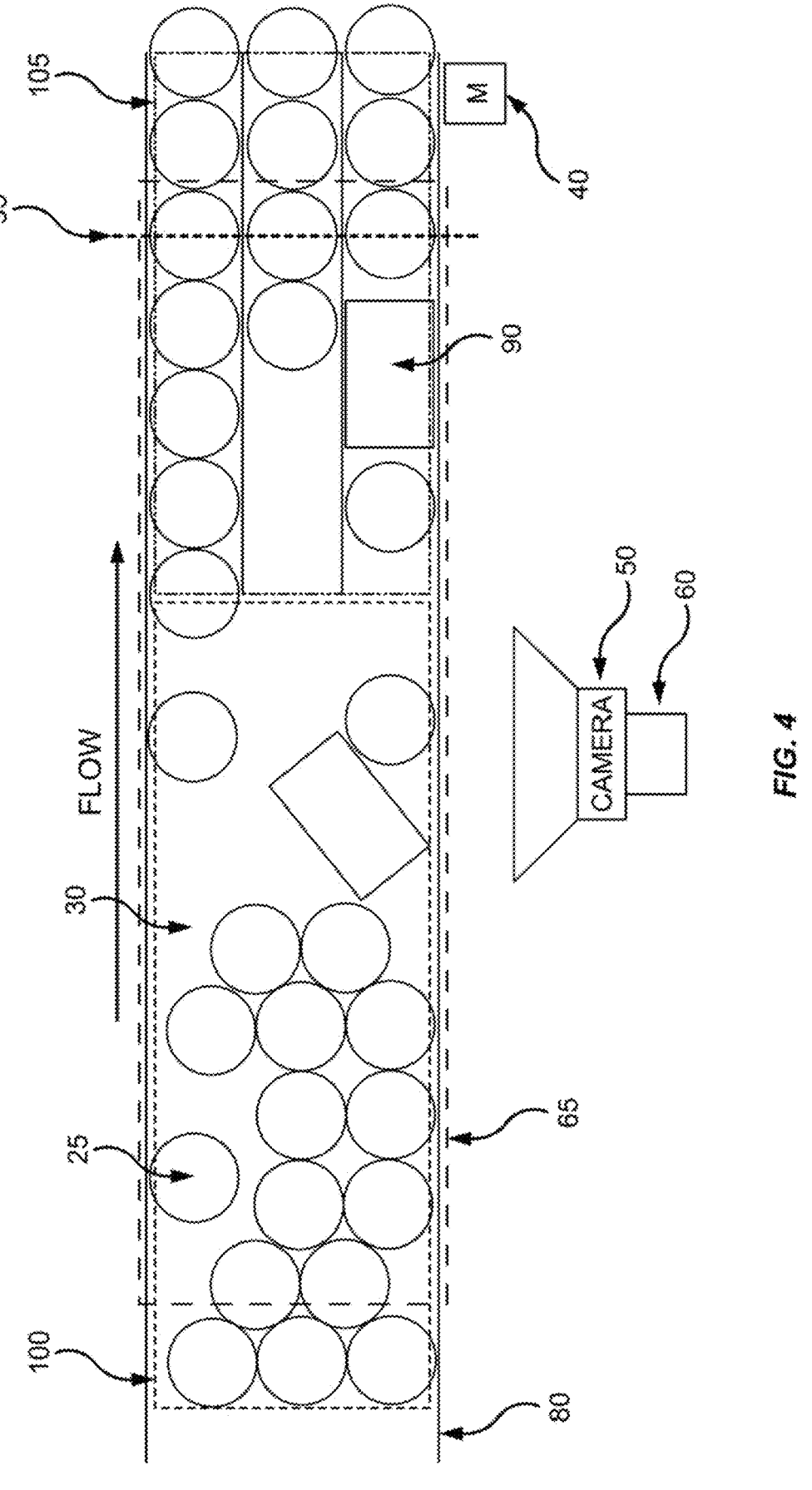
FIG. 4 is a schematic view of vision sensor down bottle and machine control system according to a preferred embodiment of this invention.

FIG. 4 shows a schematic of a preferred system and method for detecting a downed product 90 or a plurality of downed products 90 along a conveyor 30.

A plurality of products 25 preferably travel along the conveyor 30 in either a mass flow or a single file flow pattern containing a downed product 90. A camera 50 is positioned relative to the products 25 on the conveyor 30. In a preferred embodiment, the camera 50 is positioned directly overhead a flow of the products 25. Alternatively, the camera 50 may be positioned off center, overhead, or to the side of product flow provided the camera 50 can still group and recognize distinct products 25 within the product flow.

In one manner of operation, a prime line 95 is a virtual line setup in zone 65 that keeps a population of product 25 adequate for continuous operation of the downstream equipment. In one manner of operation, the processing unit 60 signals the operator that a down product 90 is present in zone 65 in the mass flow conveying area 100 on conveyer 30. In one manner of operation, the processing unit 60 signals the operator that a down product 90 is present in zone 65 in the laned conveying area 105 on conveyer 30. As described above, the prime line 95 is within zone 65. If the operator does not correct the downed product 90 before it reaches the prime line 95, the processing unit 60 will signal drive 40 to stop conveyer 30.

In one manner of operation, the processing unit 60 signals downstream equipment to stop operation until the prime line 95 population requirements are met. Conveyer 30 may continue to run even if the prime line 95 population requirements are not met.

Figure 5:
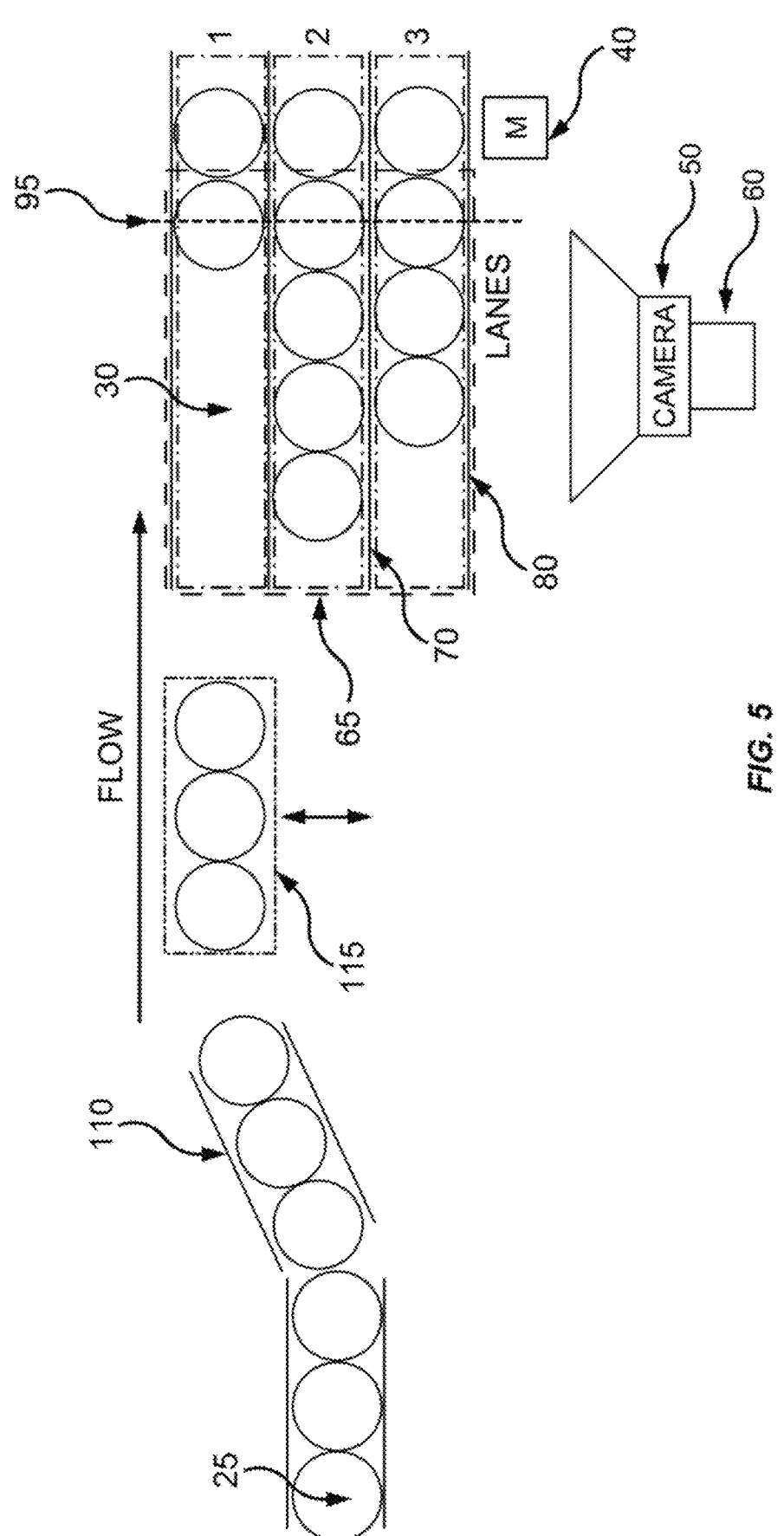
FIG. 5 is a schematic view of vision sensor lane balancing and machine control system according to a preferred embodiment of this invention.

FIG. 5 shows a schematic of a preferred system and method for controlling a laning device for product 25. A plurality of products 25 preferably travel along the conveyor 30 in a single file flow pattern entering a laner 110. A camera 50 is positioned relative to the products 25 on the conveyor 30 in zone 65 downstream of the laner 110. In this embodiment, three lanes 70 are depicted. Lanes identified as "Lane 1, 2, and 3" are included in zone 65. The laner 110 will run a plurality of product 25 into a designated lane before moving to another lane, creating a group 115 of products 25 (aka, a "slug").

In one manner of operation, the prime line 95 is a virtual line setup in zone 65 that signals the laner 110 there is enough space to accept a group 115 of product 25. The camera recognizes product 25 in transit and accumulates the added length. The processing unit 60 calculates if the prime line has been exceeded and prevents the laner from placing another group 115 of product 25 in that lane.

In one manner of operation, when product in zone 65 shows a consistent imbalance from lane to lane over a pre-determined period of time, the processing unit 60 will adjust the number of product 25 in the group 115 to account for imbalances.

Figure 6:
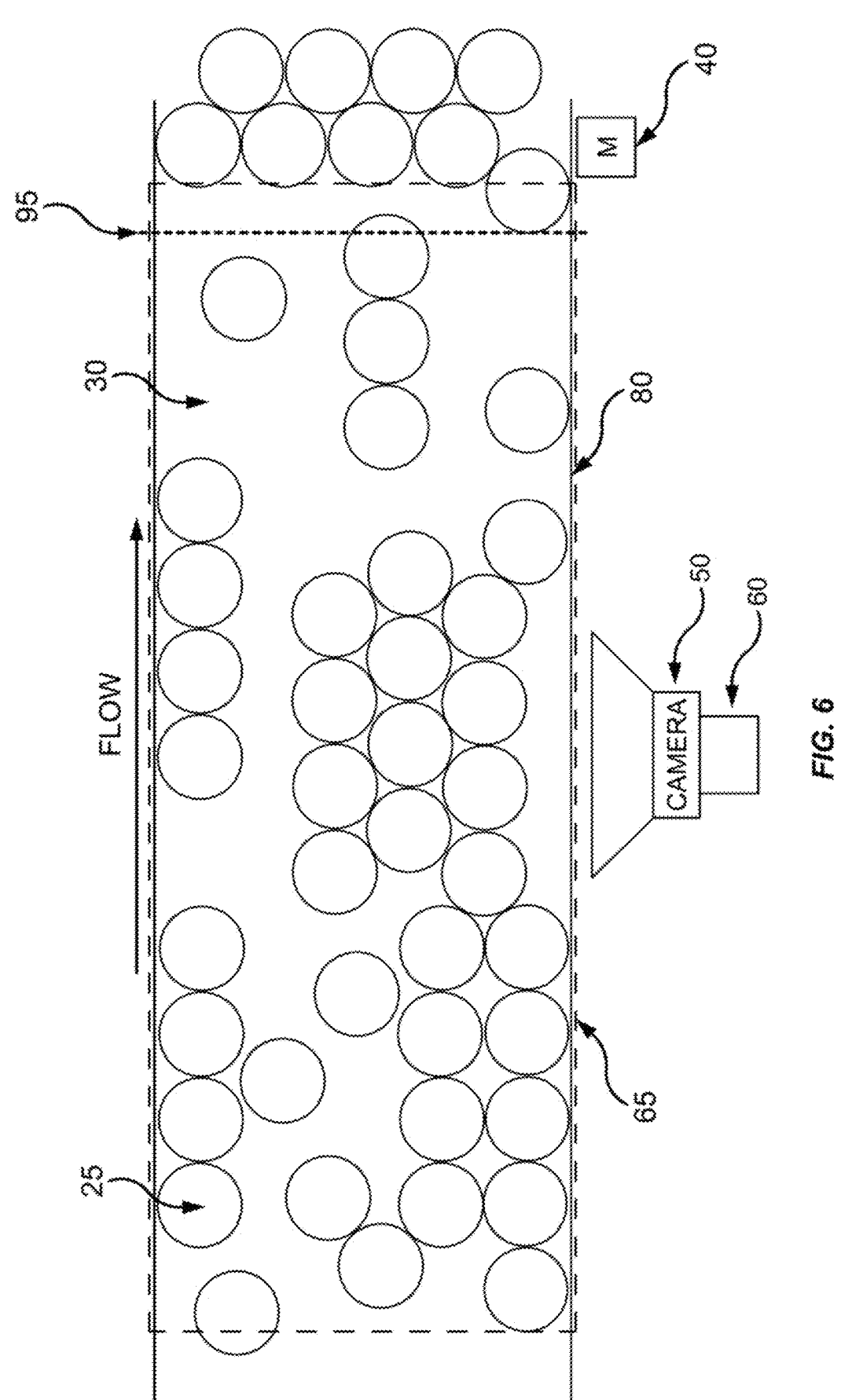
FIG. 6 is a schematic view of vision sensor pattern recognition and machine control system according to a preferred embodiment of this invention.

FIG. 6 shows a schematic of a preferred system and method for controlling product 25 in a mass flow configuration on conveyer 30. A plurality of products 25 travel along the conveyor 30 constrained only by sidewalls 80. A camera 50 is positioned relative to the products 25 on conveyor 30.

In one manner of operation, the camera 50 creates a zone 65 in which product 25 is counted and compared to requirements of downstream machine requirements by the processing unit 60. Conveyer 30 speed will be varied by adjustments to motor 40 to maintain consistent flow of product 25 passing over the prime line 95 to downstream equipment.

In one manner of operation, the conveyer 30 shifts to accumulation mode due to a product 25 restriction in flow downstream. Processing unit 60 calculates the maximum allowable quantity of product 25 within zone 65 using product 25 dimensions and sidewall 80 separation. Processing unit 60 will vary the speed of conveyer 30 using motor 40 to adjust product 25 density and minimize pressure.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

The invention claimed is:

1. A system for optimizing flow or improving at least one flow characteristic of a plurality of products along a conveyor, the system comprising:

a conveyor drive connected with the respect to the conveyor, the conveyor drive configured to modulate the speed of the conveyor;

a camera positioned relative to the products on the conveyor; and a processing unit connected with respect to the camera and the conveyor drive, the processing unit defining a zone along the conveyor having a virtual longitudinal and lateral boundary within a section of the conveyor, the processing unit further determining relative product position metrics of the products within the zone and communicating with the conveyor drive to modulate the speed of the conveyor thereby optimizing a relative position of the products within the zone, wherein the relative product position metrics comprise a vector and velocity of each adjacent product adjusted for a size of each product.

2. The system of claim 1 further comprising:

dynamic sidewalls positioned along the conveyor, the dynamic sidewalls adapted to change configuration or zone latitude based on feedback from the processing unit.

3. The system of claim 1 wherein the processing unit calculates a real-time product density within the zone to modulate the speed of the conveyor.

4. The system of claim 3 wherein the real-time product density is compared with an optimum density to adjust inputs for the conveyor.

5. The system of claim 1 further comprising a division point along the conveyor downstream of the zone, the division point including one or more lane dividers to divide groups of products into two or more single lanes.

6. The system of claim 1 wherein the processing unit modulates the conveyor using feedback loop adjustments.

7. The system of claim 1 wherein the conveyor includes generally linear sidewalls.

8. The system of claim 1 wherein the relative product position metrics comprise a distance between each adjacent product.

9. The system of claim 1 wherein the conveyor conveys products in one of a mass flow and a single file flow pattern.

10. A method for optimizing flow or improving at least one flow characteristic of a plurality of products along a conveyor, the method comprising:

driving a conveyor with a conveyor drive, the conveyor drive adapted to modulate the speed of the conveyor;

positioning a camera relative to the products on the conveyor;

counting a group of products within the conveyor;

defining a zone along the conveyor with a processing unit connected with respect to the camera and the conveyor drive, the zone having a virtual longitudinal and lateral boundary within a section of the conveyor;

determining relative product position metrics of the products within the zone with the processing unit, wherein the relative product position metrics comprise a vector and velocity of each adjacent product adjusted for a size of each product; and communicating with the conveyor drive to modulate the speed of the conveyor thereby optimizing a relative position of the products within the zone.

11. The method of claim 10 further comprising defining a prime line along the zone, the prime line used to define a desired number of containers on the conveyor.

12. The method of claim 10 further comprising communicating with dynamic sidewalls to optimize flow of the products along the conveyor.

13. The method of claim 10 further comprising:

identifying a downed product along the conveyor; and communicating a signal to a PLC and the conveyor based upon the downed product.

14. The method of claim 10 further comprising:

assigning a designated lane to the group of products within the conveyor.

15. The method of claim 10 wherein the processing unit calculates the maximum allowable quantity of products within the zone to engage an accumulation mode.

16. A system for optimizing flow or improving at least one flow characteristic of a plurality of products along a conveyor, the system comprising:

a conveyor drive connected with the respect to the conveyor, the conveyor drive configured to modulate the speed of the conveyor;

a camera positioned relative to the products on the conveyor; and a processing unit connected with respect to the camera and the conveyor drive, the processing unit defining a zone along the conveyor having a virtual longitudinal and lateral boundary within a section of the conveyor, the processing unit further determining relative product position metrics of the products within the zone and communicating with the conveyor drive to modulate the speed of the conveyor thereby optimizing a relative position of the products within the zone, wherein the relative product position metrics comprise a vector and velocity of each adjacent product adjusted for a size of each product.

17. The system of claim 16 further comprising:

dynamic sidewalls positioned relative to the conveyor, wherein the dynamic sidewalls are adapted to change configuration or zone latitude based on feedback from the processing unit.

18. The system of claim 16 wherein the conveyor includes generally linear sidewalls.

19. The system of claim 16 wherein the relative product position metrics comprise a distance between each adjacent product.

20. The method of claim 16 further comprising:

counting a group of products within the conveyor; and assigning a designated lane to the group of products within the conveyor.

* * * * *